United States Patent
Kwon et al.

(10) Patent No.: US 10,997,146 B2
(45) Date of Patent: *May 4, 2021

(54) IN-MEMORY DATABASE FOR MULTI-TENANCY

(71) Applicant: SAP SE, Walldorf (DE)

(72) Inventors: Yong Sik Kwon, Seoul (KR); Yongsik Yoon, Seoul (KR); Joo Yeon Lee, Anyang (KR); Oliver M. Steinau, Mannheim (DE); Markus Hartmann, Beindersheim (DE)

(73) Assignee: SAP SE, Walldorf (DE)

( * ) Notice: Subject to any disclaimer, the term of this patent is extended or adjusted under 35 U.S.C. 154(b) by 333 days.

This patent is subject to a terminal disclaimer.

(21) Appl. No.: 16/107,917

(22) Filed: Aug. 21, 2018

(65) Prior Publication Data

US 2019/0005080 A1   Jan. 3, 2019

Related U.S. Application Data

(63) Continuation of application No. 15/256,323, filed on Sep. 2, 2016, now Pat. No. 10,102,237, which is a
(Continued)

(51) Int. Cl.
*G06F 16/22* (2019.01)
*G06F 16/27* (2019.01)
(Continued)

(52) U.S. Cl.
CPC ........ *G06F 16/2282* (2019.01); *G06F 16/211* (2019.01); *G06F 16/221* (2019.01);
(Continued)

(58) Field of Classification Search
CPC ......... G06F 17/30595; G06F 17/30607; G06F 17/30389; G06F 17/30442; G06F 17/30477; G06F 17/30292
(Continued)

(56) References Cited

U.S. PATENT DOCUMENTS 5,897,632 A   4/1999  Dar et al.
7,318,076 B2  1/2008  Chen et al.
(Continued)

OTHER PUBLICATIONS

"MySQL 5.0 Reference Manual" revision 34567 (Mar. 8, 2013) downloads.mysql.com/docs/refman-5.0-en.a4.pdf.
(Continued)

*Primary Examiner* — Angelica Ruiz
(74) *Attorney, Agent, or Firm* — Mintz Levin Cohn Ferris Glovsky and Popeo, P.C.

(57) ABSTRACT

An in-memory database server hosting a tenant of a multi-tenant software architecture can receive a definition of a custom data field that is unique to an organization having isolated access to the tenant. The custom data field can extend a standard table defined by central metadata stored at a system tenant of the multi-tenant software architecture. Tenant private metadata that includes the definition can be stored in memory accessible only to the tenant. A tenant-dependent table that includes the custom data field can be formed, for example by retrieving central metadata defining the standard table from the system tenant and adding the custom data field using the definition. The tenant-dependent table can be presented for access via a database client at the organization. Related systems, articles of manufacture, and computer-implemented methods are disclosed.

19 Claims, 12 Drawing Sheets

Related U.S. Application Data continuation of application No. 12/980,901, filed on Dec. 29, 2010, now Pat. No. 9,460,176.

(51) Int. Cl.
 *G06F 16/21* (2019.01)
 *G06F 16/248* (2019.01)
 *G06F 16/951* (2019.01)

(52) U.S. Cl.
 CPC ............ *G06F 16/248* (2019.01); *G06F 16/27* (2019.01); *G06F 16/951* (2019.01)

(58) Field of Classification Search
 USPC ........... 707/600–831, 899, 999.001–999.206
 See application file for complete search history.

(56) References Cited

U.S. PATENT DOCUMENTS

| | | | | |
|---|---|---|---|---|
| 7,779,039 | B2* | 8/2010 | Weissman | G06F 16/284 707/793 |
| 8,244,759 | B2* | 8/2012 | Brooks | H04L 67/34 707/782 |
| 9,460,176 | B2 | 10/2016 | Kwon et al. | |
| 2005/0223022 | A1 | 10/2005 | Weissman et al. | |
| 2007/0271211 | A1 | 11/2007 | Butcher et al. | |
| 2008/0082540 | A1 | 4/2008 | Weissman et al. | |
| 2010/0076946 | A1 | 3/2010 | Barker et al. | |

OTHER PUBLICATIONS

"MySQL 5.0 Reference Manual" section 14.3 as archived Oct. 18, 2005.

"MySQL 5.0 Reference Manual" section 14.6.3 as archived Oct. 28, 2005 http://web.archive.org/web/20051028044739/http://dev.mysql.com/doc/refman-/5.0/en/federated-use.html.

"MySQL 5.0 Reference Manual" section 3.3.1 as archived Oct. 24, 2005 http://web.archive.org/web/20051024045341/http://dev.mysql.com/doc/refman-/5.0/en/creating-database.html.

"MySQL 5.0 Reference Manual" Section 3.3.2 as archived Oct. 23, 2005 http://web.archive.org/web/20051023013237/http://dev.mysql.com/doc/refman-/5.0/en/creating-tables.html.

"MySQL 5.0 Reference Manual" section 3.3.3 as archived Oct. 24, 2005 http://web.archive.org/web/20051024041409/http://dev.mysql.com/doc/refman-/5.0/en/loading-tables.html.

"MySQL 5.0 Reference Manual" section 3.6.6 as archived Oct. 26, 2005 http://web.archive.org/web/20051026052347/http://dev.mysql.com/doc/refman-/5.0/en/example-foreign-keys.html.

"MySQL 5.0 Reference Manual" section 5.8.2 as archived Oct. 23, 2005 http://web.archive.org/web/20051023004827/http://dev.mysql.com/doc/refman- /5.0/en/adding-users.html.

"Solid-State drive" Wikipedia.com as pulled from edit history (Dec. 15, 2009).

Aulbach, Stefan, et al. "Multi-tenant databases for software as a service: schema-mapping techniques." Proceedings of the 2008 ACM SIGMOD international conference on Management of data. ACM, 2008.

Motro, Amihai. "An access authorization model for relational databases based on algebraic manipulation of view definitions." Data Engineering, 1989. Proceedings. Fifth International Conference on. IEEE, 1989.

Sayyadian, Mayssam, et al. "Efficient keyword search across heterogeneous relational databases." Data Engineering, 2007. ICDE 2007. IEEE 23rd International Conference on. IEEE, 2007.

Soror, Ahmed A., et al. "Automatic virtual machine configuration for database workloads." ACM Transactions on Database Systems (TODS) 35.1 (2010): 7.

* cited by examiner

| | TABLE CONTENT (DATA) | METADATA |
|---|---|---|
| TENANT INDEPENDENT TABLES | STORED IN SYSTEM TENANT. READ ACCESS FROM OTHER TENANTS | STORED IN SYSTEM TENANT. READ ACCESS FROM OTHER TENANTS |
| TENANT DEPENDENT TABLES | INDEPENDENT INSTANCES OF TABLE EXIST IN EACH TENANT WITH CONTENT PRIVATE TO TENANT | TABLE DEFINITION STORED CENTRALLY IN SYSTEM TENANT WITH READ ACCESS FROM OTHER TENANTS. TENANT-SPECIFIC EXTENSIONS STORED AS PRIVATE METADATA OF TENANT |
| TENANT PRIVATE TABLES | STORED AS PRIVATE DATA OF TENANT WITH NO ACCESS FROM OTHER TENANTS | STORED AS PRIVATE METADATA OF TENANT WITH NO ACCESS FROM OTHER TENANTS |

FIG. 11

IN-MEMORY DATABASE FOR MULTI-TENANCY

CROSS REFERENCE TO RELATED APPLICATIONS

This application is a continuation of U.S. patent application Ser. No. 15/256,323 filed on Sep. 2, 2016, entitled "IN-MEMORY DATABASE FOR MULTI-TENANCY," which is a continuation of U.S. patent application Ser. No. 12/980,901, filed on Dec. 29, 2010, now U.S. Pat. No. 9,460,176, issued Oct. 4, 2016, entitled "IN-MEMORY DATABASE FOR MULTI-TENANCY," the entire contents of these applications are incorporated herein by reference in their entirety.

TECHNICAL FIELD

The subject matter described herein relates to the used of in-memory database technology in conjunction with a multi-tenant software delivery architecture.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

SUMMARY

In one aspect, a computer-implemented method includes receiving, at an in-memory database server hosting a tenant of a multi-tenant software architecture, a definition of a custom data field that is unique to an organization having isolated access to the tenant. The custom data field extends a standard table defined by central metadata stored at a system tenant of the multi-tenant software architecture. Tenant private metadata that includes the definition are stored in memory accessible only to the tenant. A tenant-dependent table that includes the custom data field is form. The forming includes retrieving, from the system tenant, central metadata defining the standard table and adding the custom data field using the definition. The tenant-dependent table is presented for access via a database client at the organization.

In some variations one or more of the following can optionally be included. A second definition of a customized tenant private table that is unique to the tenant can be received at the in-memory database server. Additional tenant private metadata that include the second definition can be stored in the memory accessible only to the tenant, and the tenant private table can be presented for access via the database client at the organization. The multi-tenant software architecture can include a plurality of tenants hosted at a backend system. Each tenant of the plurality of tenants can include its own dedicated in-memory database server having unique access to tenant-specific data. At least one of the plurality of database servers can be provided via each of a plurality of hosts on the backend system. The plurality of database servers can share the central metadata of the system tenant. The system tenant can include a central metadata master database server responsible for creating and maintaining the central metadata. Each host of the plurality of hosts can include a local metadata master database server that receives a copy of the central metadata from the central metadata master database server. An updated definition of a tenant dependent table that is available to all of the plurality of tenants can be received at the central metadata master database server. New central metadata that include the updated definition can be stored in a system tenant memory accessible only to the system tenant. The new central metadata can be propagated to each local metadata master database server for use by the plurality of tenants.

It should be noted that, while the descriptions of specific implementations of the current subject matter discuss delivery of enterprise resource planning software to multiple organizations via a multi-tenant system, the current subject matter is applicable to other types of software and data services access as well. The scope of the subject matter claimed below therefore should not be limited except by the actual language of the claims.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 11 shows a table listing features of different types of database tables in an in-memory multi-tenant architecture.

When practical, similar reference numbers denote similar structures, features, or elements.

DETAILED DESCRIPTION

Figure 1:
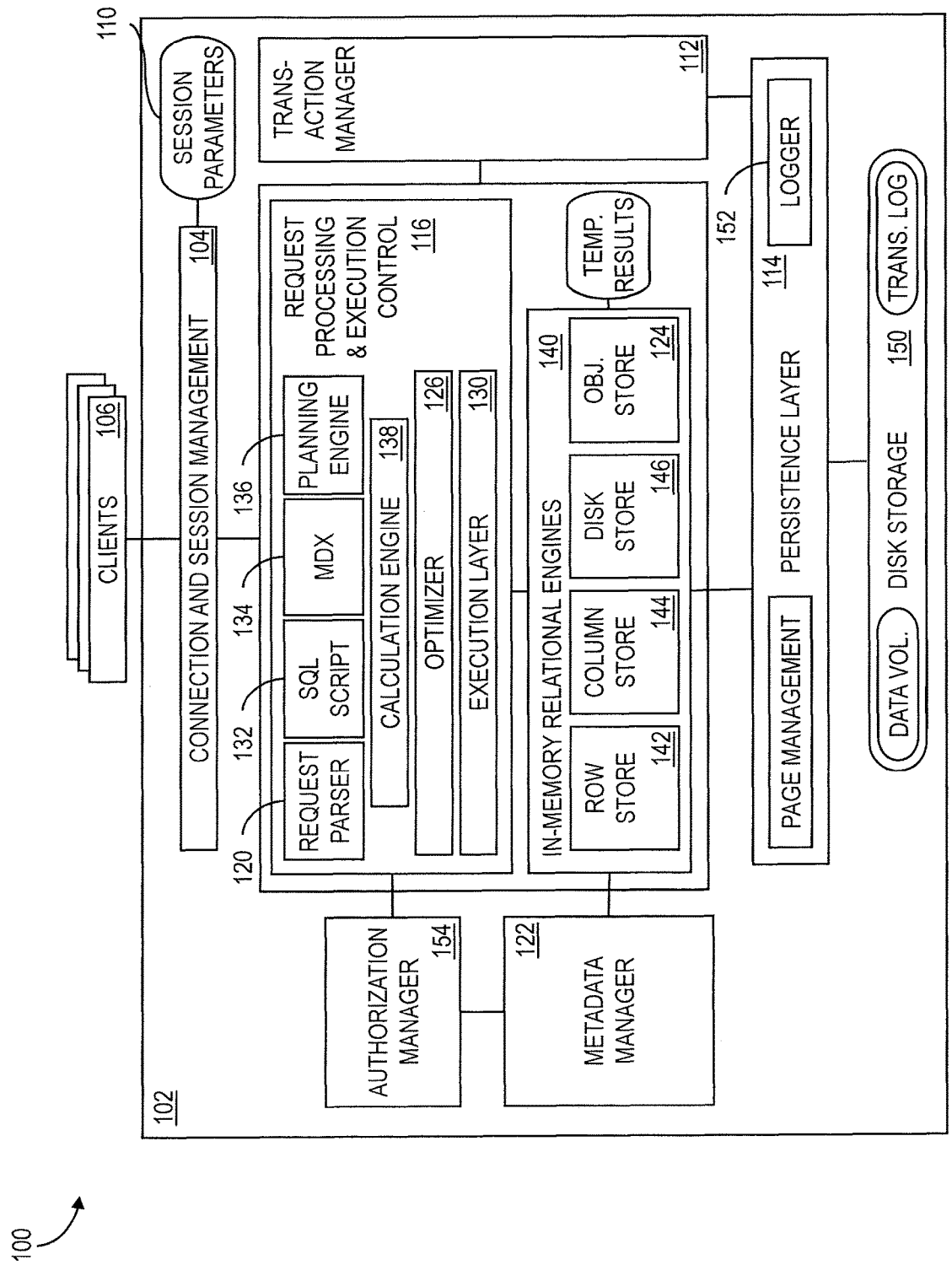
FIG. 1 is a diagram illustrating features of an in-memory database server.

Previously available database management systems have typically been designed for optimizing performance on hardware with limited main memory and with the slow disk input/output (I/O) as the main bottleneck. The typical focus in architecture design was on optimizing disk access, for example by minimizing a number of disk pages to be read in to main memory when processing a query.

Computer architectures have changed substantially over time. With multi-core central processing units (CPUs), parallel processing is possible with fast communication between processor cores, for example via main memory or one or more shared caches. Main memory is also much less likely to be a limited resource thanks to ever decreasing costs. Servers with more than 2 TB RAM are currently available. Modern computer architectures create new possibilities but also new challenges. With all relevant data in memory, disk access is no longer a limiting factor for performance. Server processors can currently have up to 64 cores and 128 cores will come in the near future. With the increasing number of cores, CPUs will able to process more and more data per time interval. Thus, the performance bottlenecks more commonly occur between the CPU cache and main memory than due to disk read/write processes. Traditional databases of online transaction processing systems typically do not make the most efficient use of currently available hardware. In a memory resident traditional database management system, the CPU can spend as much as half of its execution time in stalls, for example waiting for data being loaded from main memory into the CPU cache.

To address these and potentially other issues with currently available solutions, one or more implementations of the current subject matter provide methods, systems, articles or manufacture, and the like that can, among other possible advantages, provide a multi-tenancy software architecture employing in-memory database technologies and, in at least some implementations, cache aware memory, optimization, and execution; support for parallel execution; and the like.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management event, such as for example an upgrade or update, many application specific tasks may have to be executed in a multi-tenant system. One or more of these actions have to run on every business tenant that exists in the multi-tenant system. However, to start a task on a specific tenant, a user logon with password can be necessary, thereby requiring that the lifecycle management procedure have ready access to authentication information, such as for example user names and passwords, for each tenant.

According to the current subject matter, all relevant data can be kept in main memory, so read operations can be executed without disk read and write operations. Disk-based index structures, for example, are not needed for an in-memory database. Disk storage is still necessary to make changes durable, but the required disk write operations can be performed asynchronously in the background. In addition, disk storage can be used to store aged data that is not needed during normal operations.

Architectures consistent with the current subject matter can minimize the number of CPU cache misses and avoid CPU stalls because of memory access. One approach for achieving this goal is using column based storage in memory. Search operations or operations on one column can be implemented as loops on data stored in contiguous memory arrays, which can result in high spatial locality of data and instructions, so the operations can be executed completely in the CPU cache without costly random memory accesses.

Recent improvements in CPU processing speed have generally not resulted from increased processor clock speeds. Rather, the number of processor cores has increased. To maximize efficiency, software must make use of multi core CPUs by allowing parallel execution and including architectures that scale well with the number of cores. For data management systems, it is advantageous to allow partitioning of data in sections for which the calculations can be executed in parallel. To ensure scalability, sequential processing—for example enforced by locking—can advantageously be avoided.

FIG. 1 shows a block diagram of an in-memory relational database server 100 consistent with implementations of the current subject matter. A connection and session management component 102 of an in-memory database system 104 creates and manages sessions and connections for the database clients 106. For each session a set of parameters 110 is maintained such as for example auto commit settings or the current transaction isolation level. Once a session is established, database clients 106 can use logical (e.g. SQL) statements to communicate with the in-memory database system 104. For analytical applications the multidimensional query language MDX can also be supported.

Each statement can be processed in the context of a transaction. New sessions can be implicitly assigned to a new transaction. A transaction manager 112 can coordinate transactions, control transactional isolation, and keep track of running and closed transactions. When a transaction is committed or rolled back, the transaction manager 112 can inform the involved engines about this event so they can execute necessary actions. The transaction manager 112 can cooperate with a persistence layer to achieve atomic and durable transactions.

Requests received from the database clients 106 can be analyzed and executed by a set of request processing and execution control components 116, which can include a request parser 120 that analyses a request from a database client 106 and dispatches it to a responsible component. Transaction control statements can, for example, be forwarded to the transaction manager 112, data definition statements can be dispatched to a metadata manager 122 and object invocations can be forwarded to an in-memory object store 124. Data manipulation statements can be forwarded to an optimizer 126, which creates an optimized execution plan that is provided to an execution layer 130. The execution layer 130 can act as a controller that invokes the different engines and routes intermediate results to a next phase in execution of the execution plan.

Built-in support can be offered for domain-specific models (such as for financial planning) scripting capabilities that allow to run application-specific calculations inside NewDB. A scripting language, for example SQL Script 132, which is based on side effect free functions that operate on tables using SQL queries for set processing, can be used to enable optimizations and parallelization. The MDX language 134 can be used to provide support for multidimensional queries. A planning engine 136 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 132, MDX 134, and planning engine 136 operations can be implemented using a common infrastructure called a calculation engine 138. Metadata can be accessed via the metadata manager component 122. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 122.

One or more relational engines 140, for example an in-memory row store 142, an in-memory column store 144, a disk-based store 146, and the in-memory object store 124 mentioned above can communicate with the request processing and execution control components 116, the metadata manager 122, and the in-memory persistence layer 114. The row store 142 and column store 144 are each relational in-memory data engines that can store data in a row-based or column-based way, respectively. Some data, such as for example tracing data, need not be kept in memory all the time. The disk-based store 146 can handle such data. Data in the disk-based store 146 can be primarily stored in disk storage 150 and only moved to memory buffers (e.g the persistence layer 114 when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 114 can be responsible for durability and atomicity of transactions and can ensure that the database is restored to the most recent committed state after a restart and that transactions are either completely executed or completely undone. To achieve this goal in an efficient way, the persistence layer 114 can use a combination of write-ahead logs, shadow paging and save points. The persistence layer 114 can offer interfaces for writing and reading data and can also contain a logger 152 that manages the transaction log. Log entries can be written implicitly by the persistence layer 114 when data are written via a persistence interface or explicitly by using a log interface.

An authorization manager 154 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

Implementations of the current subject matter can include features of distributed architectures that provide multi-tenant support and data distribution that enables scalability. Multi tenant support, as described above, allows hosting multiple "virtual" systems inside one physical system with isolation of the virtual systems from each other. The current subject matter supports tenant isolation on a database level. In a multi-tenant implementation, isolation can be achieved by having separate database processes and separate disk volumes for the different tenants. Thus, a multi-tenant architecture can be distributed across multiple database server processes 102, such as that shown in FIG. 1.

Figure 2:
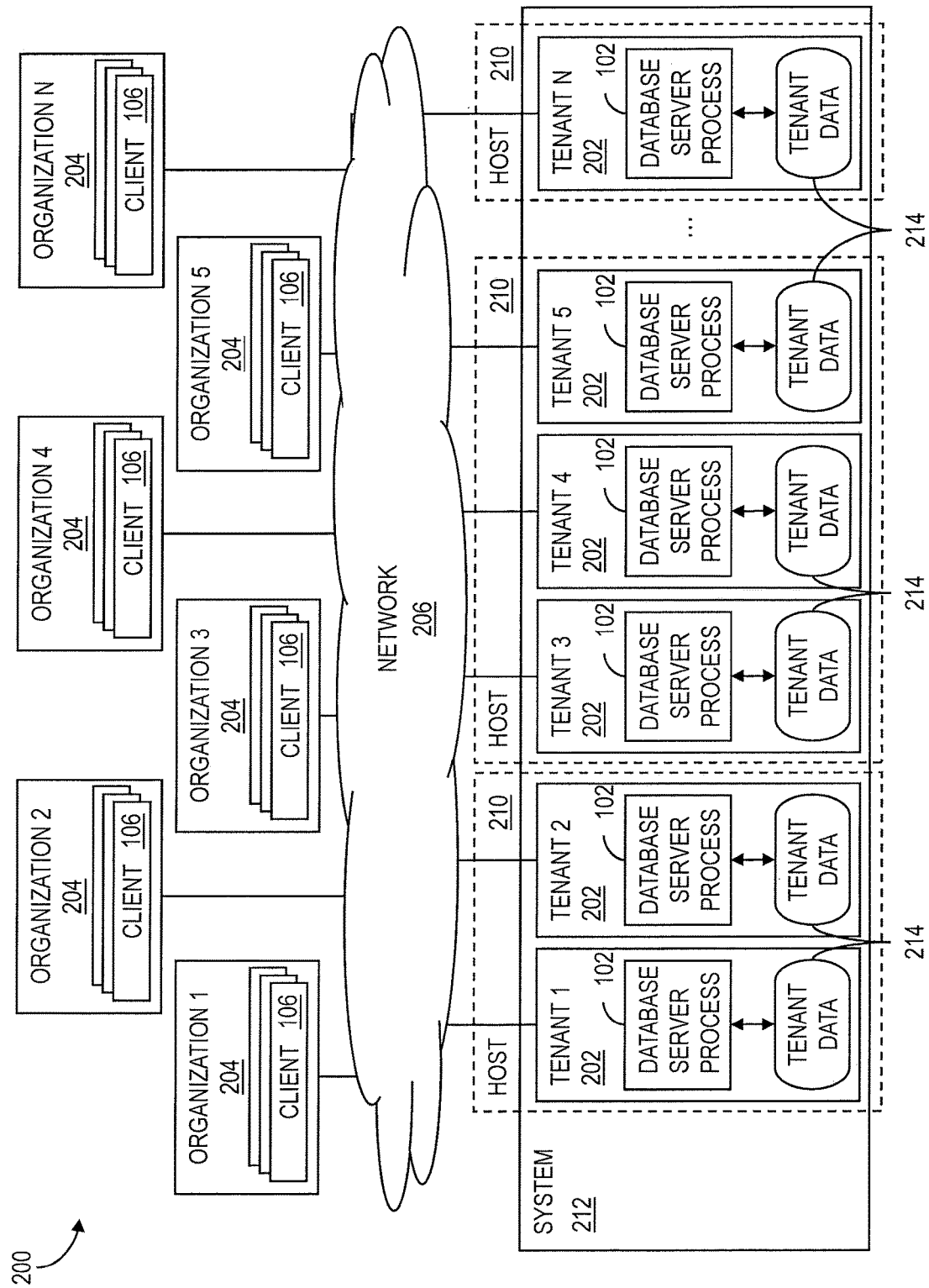
FIG. 2 is a diagram illustrating features of a multi-tenant architecture using an in-memory database server with multiple tenants per host.

As shown in the architecture 200 of the diagram shown in FIG. 2, multiple tenants 202, each isolated from one another and available to be accessed by clients 106 within a separate organization 204 via a network 206, can be hosted by the same host 210. A host 210 can be a virtual machine on a larger system 212 or one or more physical processors. Tenants 202 can also be distributed across multiple host processes 210. Data distribution means that tables or ranges within tables are assigned to different database partitions that are assigned to different host processes 210 for scalability reasons. Each tenant 202 can be served by a single database server process 102 accessing tenant data 214 for the respective tenant 202 that is isolated form all other tenants 202.

Figure 3:
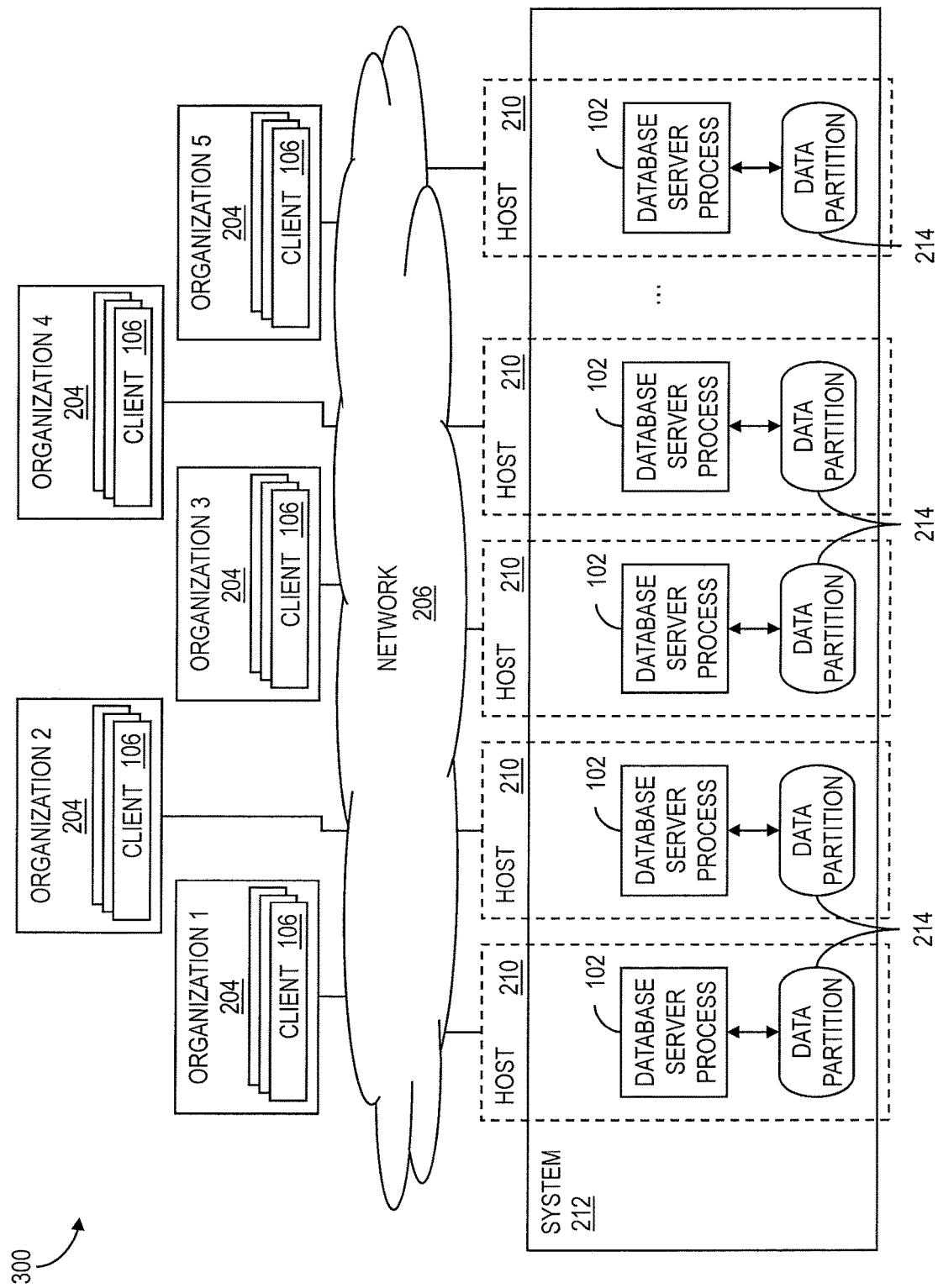
FIG. 3 is a diagram illustrating features of a multi-tenant architecture using an in-memory database server with a single tenant per host.

FIG. 3 shows an example of a system architecture 300 consistent with an implementation that includes data distribution for scalability reasons. Such a configuration can be used for large, on-premise or stand-alone systems with high performance requirements. Each data server process 102 and its associated data partition 302 is assigned to a discrete host 210. Again, a host 210 can be a virtual machine on a larger system 212 or one or more physical processors.

Figure 4:
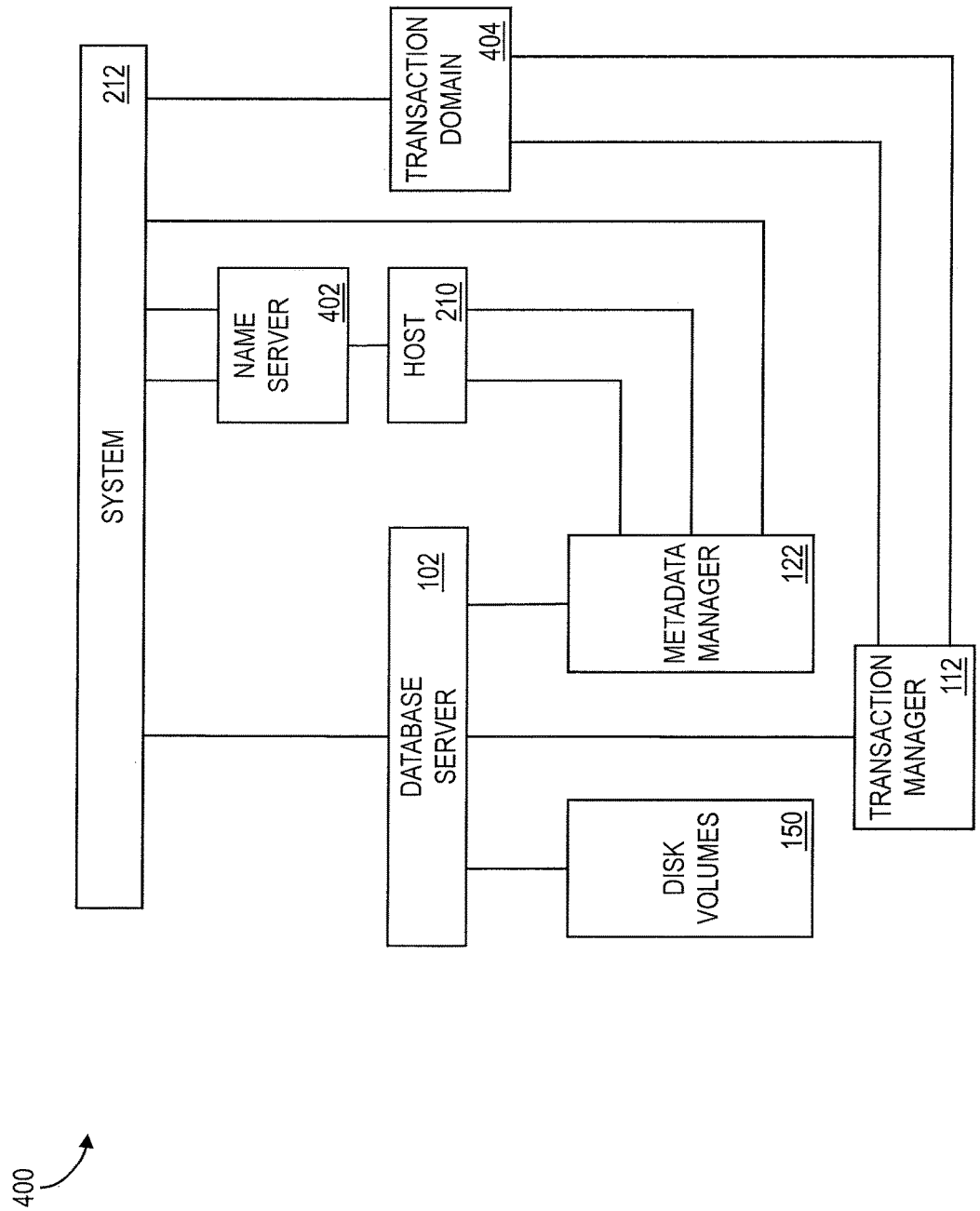
FIG. 4 is a diagram illustrating features of a distributed, in-memory system.

FIG. 4 shows a box diagram of a distributed, in-memory system 400 consistent with at least one implementation of the current subject matter. A distributed system 212 can include multiple database servers 102, each of which contains all or at least some of the components shown in FIG. 1 and described above. Each database server 102 can include a separate operating system process and its own disk volume(s) 150. The database servers 102 of a distributed system 212 can be distributed across multiple hosts 210, but it is also possible to run multiple database servers 102 on one host 210. During processing of database operations, database servers 102 can forward the execution of some operations to other database servers 102 that own data involved in the operation.

Figure 5:
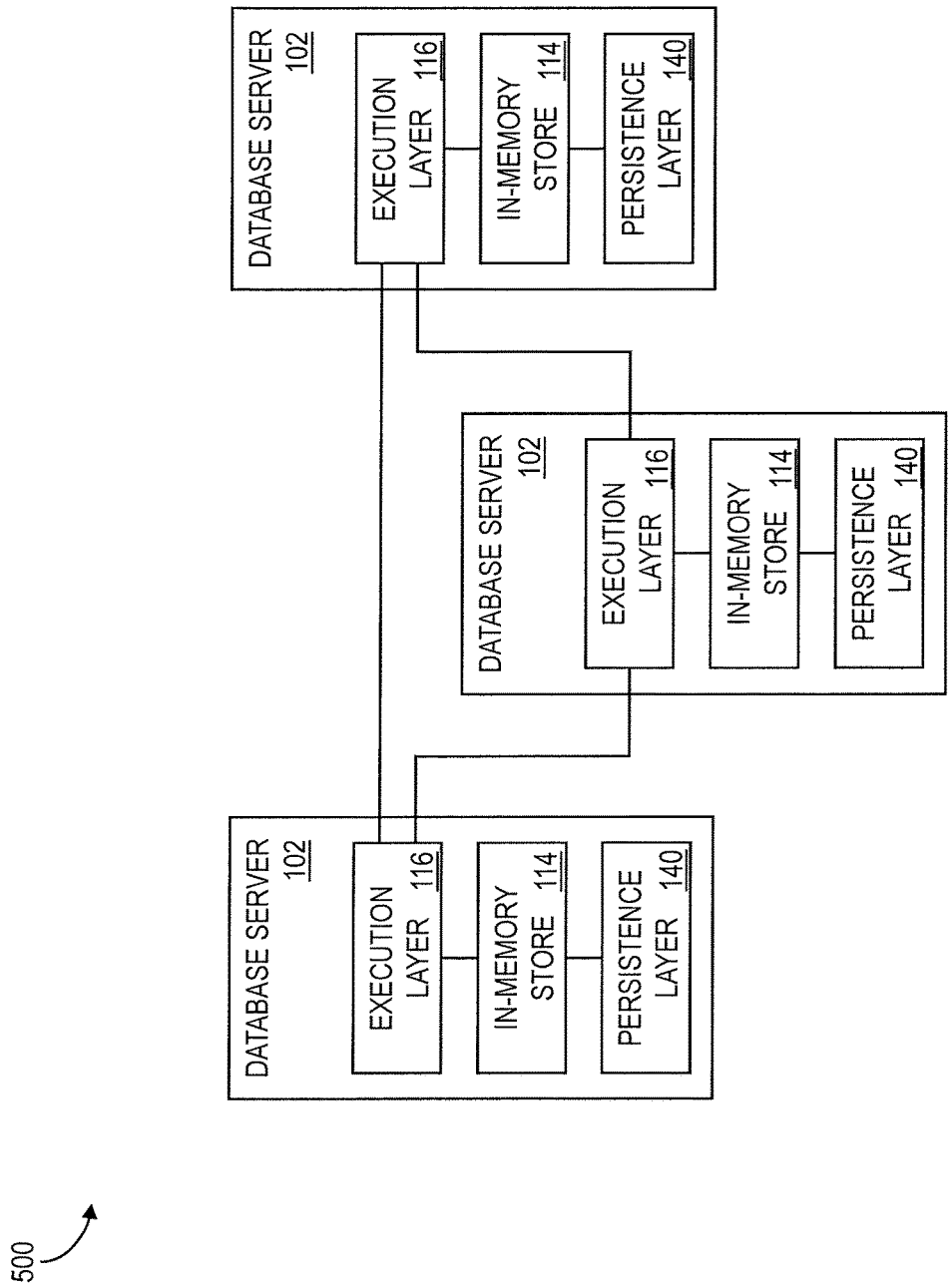
FIG. 5 is a diagram illustrating features of data sharing between in-memory database servers.

In a data distribution scenario, for example without tenant separation, the database clients 106 need not know about the distribution. They may send their requests to any database server 102. If the server 102 does not own all data involved, it can delegate the execution of some operations to other database servers 102, collect the result and return it to the database client 106. In a distributed system, execution plans can contain operations that are executed on remote servers 102. The execution control layer 116 of each database server 102 can connect to the execution control layers 116 of other database servers 102 of the same distributed system 212 to request remote execution of operations, such as for example as shown in the data exchange diagram 500 of FIG. 5.

In a distributed system, a central component, referred to herein as a name server 402 knows the topology of the system and how data is distributed. In a multi-tenant system, the name server 402 also knows the assignment of tenants to the specific database servers 102. In a system with data distribution, the name server 402 knows which tables or partitions of tables are located on which database server 102. A database server 102 processes a query by asking the name server 402 about the locations of the involved tables.

Distributed transactions can be supported to ensure transactional consistency in distributed setups. Each system can have multiple transaction domains 404 to which the database servers 102 are uniquely assigned. A distributed transaction may span only the database servers 102 within the same transaction domain 404. In a transaction domain 404, one database server 102 can act as a transaction master, while the other database servers 102 act as transaction slaves.

In a transaction domain 404, transactions tokens or other containers for information needed to construct a consistent view for a transaction or a statement can be centrally managed by the transaction master 112. In some implementations, a transaction token can be passed as an additional context information to all operations and engines that are involved in the execution of a statement. The transaction master 112 can also maintain a list of open transactions, increase timestamp sequences such as transaction identifiers and commit identifiers, and coordinate distributed commit operations.

Figure 6:
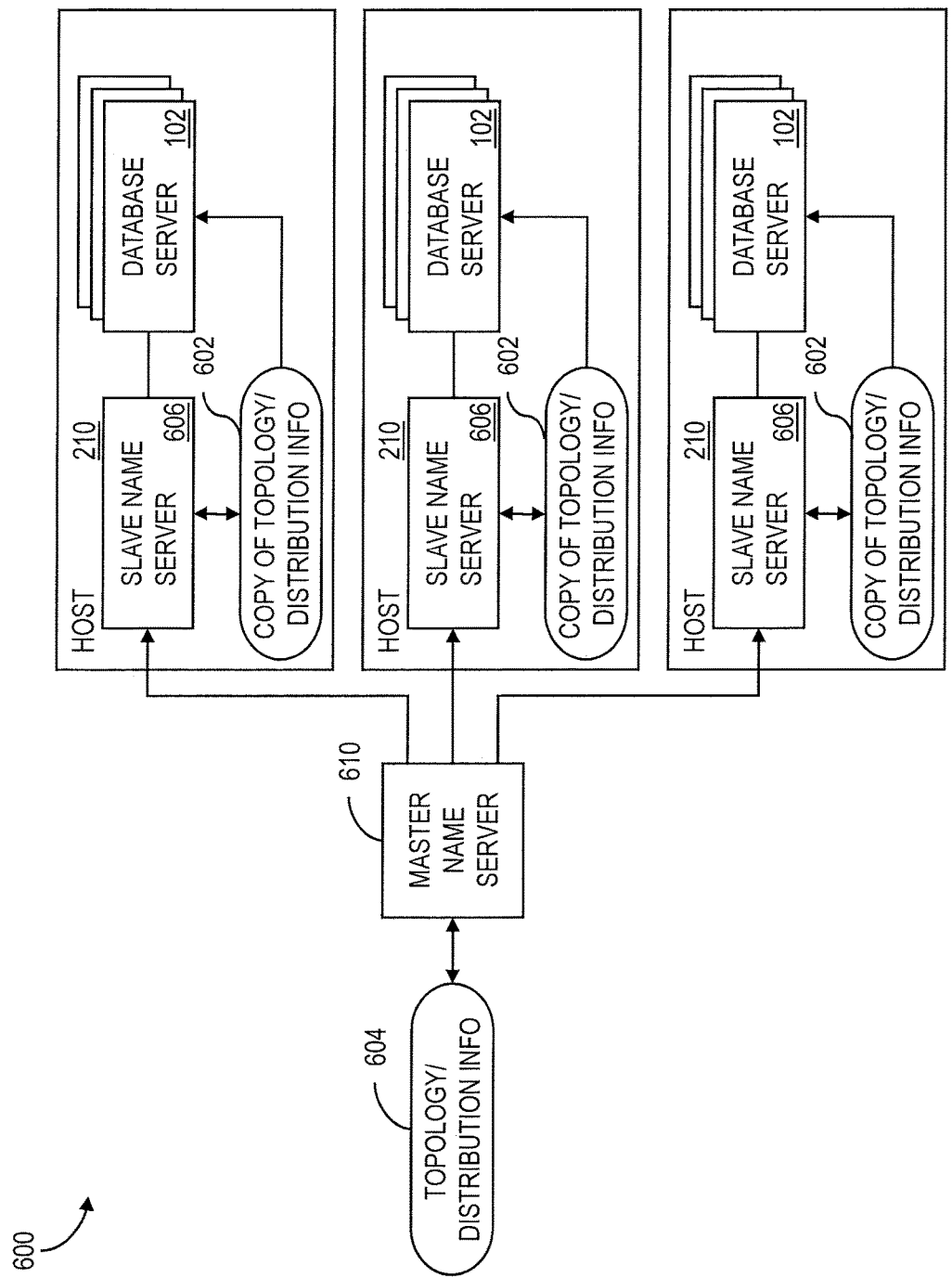
FIG. 6 is a diagram illustrating features of a system including a master name server and slave name servers.

To reduce the likelihood of such an inquiry resulting in a negative impact on performance, a copy 602 of the topology and distribution information 604 can be replicated and cached as a on each host 210. These data can be replicated to slave name servers 606 that run on each host 210. The slave name servers 606 can write the replicated data 602 to a cache in shared memory from which any other database servers 102 on the same host 210 can read the replicated data 602 (if the data belong to the same system). The block diagram in FIG. 6 shows an example with a master name server 610 and slave name servers 606 on three different hosts 210.

In a data distribution scenario, the partitioning can be done table wise or also by splitting tables. With table wise partitioning, the master name server 610 assigns new tables to a database server 102 based on the current distribution of tables (number of tables assigned to each database server). Then data for this table will reside only on that database server 102. It is also possible to specify that a table is split over multiple database servers 102. Partitioning of the table can be done by the master name server 610 based on a size estimation specified by the application. When records are inserted into a split table, the records can be distributed to other database servers 102 based on master name server 610 information. In a multi-tenant system, partitioning can be done according to tenant 202 as discussed in greater detail below.

The master name server 610 is a critical component in a distributed system. To ensure high availability, it is possible to have one or more additional name servers as backup master name servers. During normal operation, the backup master name servers can receive all replicated data like any slave name server 606. However, if the master name server 610 fails, the backup server takes over the role of the master name server 610. If the system includes two or more backup master name servers, the backup master name servers negotiate and one of them takes over the role of the master name server 610.

Figure 7:
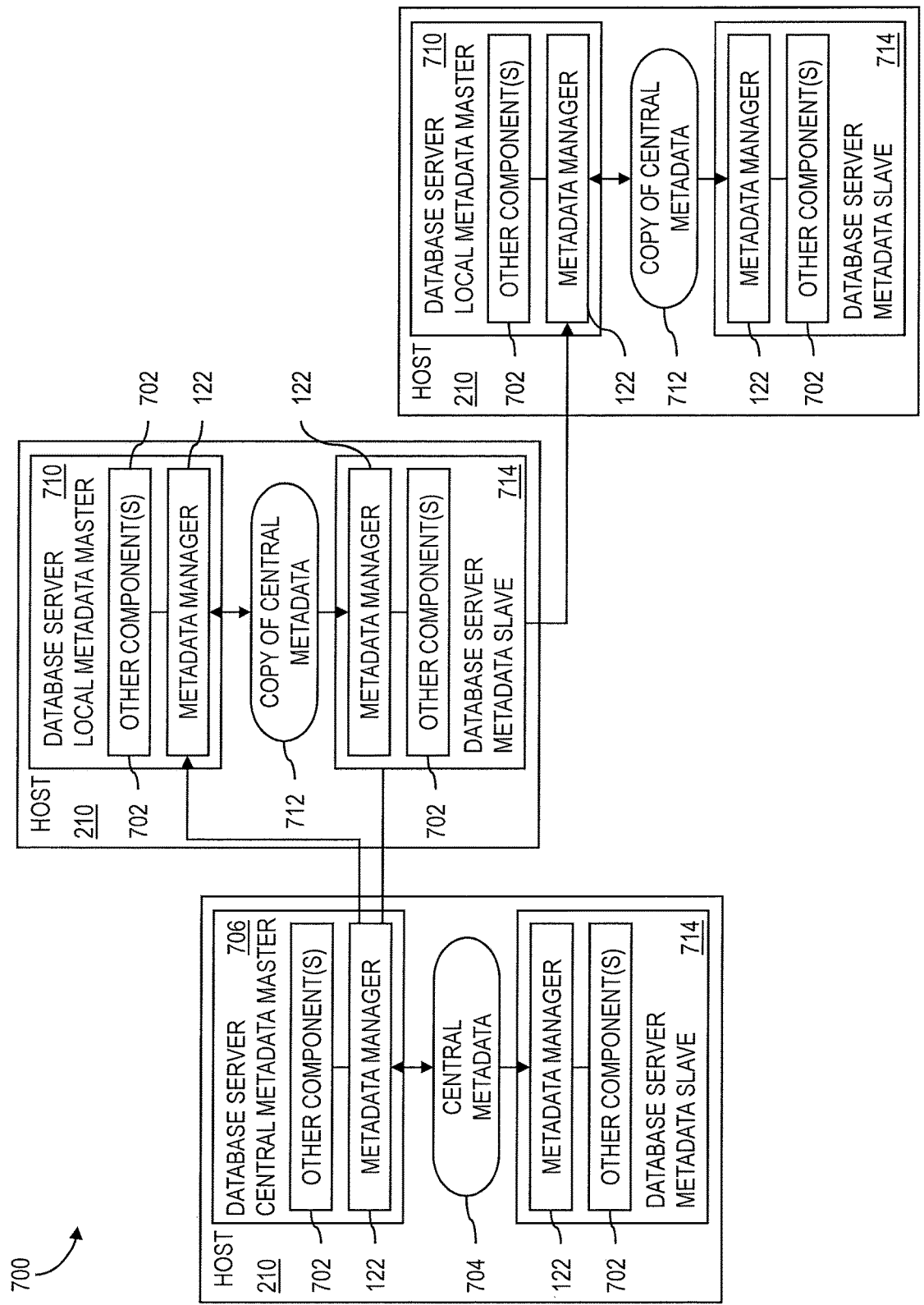
FIG. 7 is a diagram illustrating features of an architecture for replication of central metadata.

An example of an architecture 700 for replication of central metadata is shown in FIG. 7. Each database server 102 can contain a metadata manager 122 that provides metadata related interfaces to other system components 702. In a distributed system, metadata can be defined and stored centrally and replicated to all database servers 102. Central metadata 704 can be created in a specific database server having the role of the central metadata master 706. One central metadata master 706 can be included per system. On each other host 210, a local metadata master 710 receives a copy 712 of the central metadata from the central metadata master 706. The local metadata master 710 makes the replicated metadata available to the database servers on the same host 210 using shared memory. These database servers are called metadata slaves 714. Metadata slaves 714 have only read access to the central metadata 704 or copy of the central metadata 712. The central metadata master 706 and local metadata master 710 need not be separate server processes but roles played by specific database servers. Metadata replication can be handled transparently by the metadata managers 122. Other system components 702 can use the metadata manager interface so the replication of metadata can be completely hidden from them. For read access, metadata replication can also be transparent for database clients 106. Regardless of the database server to which a database client 106 is connected, the database client 106 can read all central metadata 704.

Central metadata 704 can be created in the central metadata master 706. A database client 106 that needs to create or change central metadata 704 can be required to connect to the metadata master 706 to do so. However, metadata can also be defined in the other database servers 102 of an architecture. Such metadata is local to the database server 102 where it is created and is not shared with others. This feature can be used for multi-tenant systems for defining metadata that is private to a specific tenant.

Figure 8:
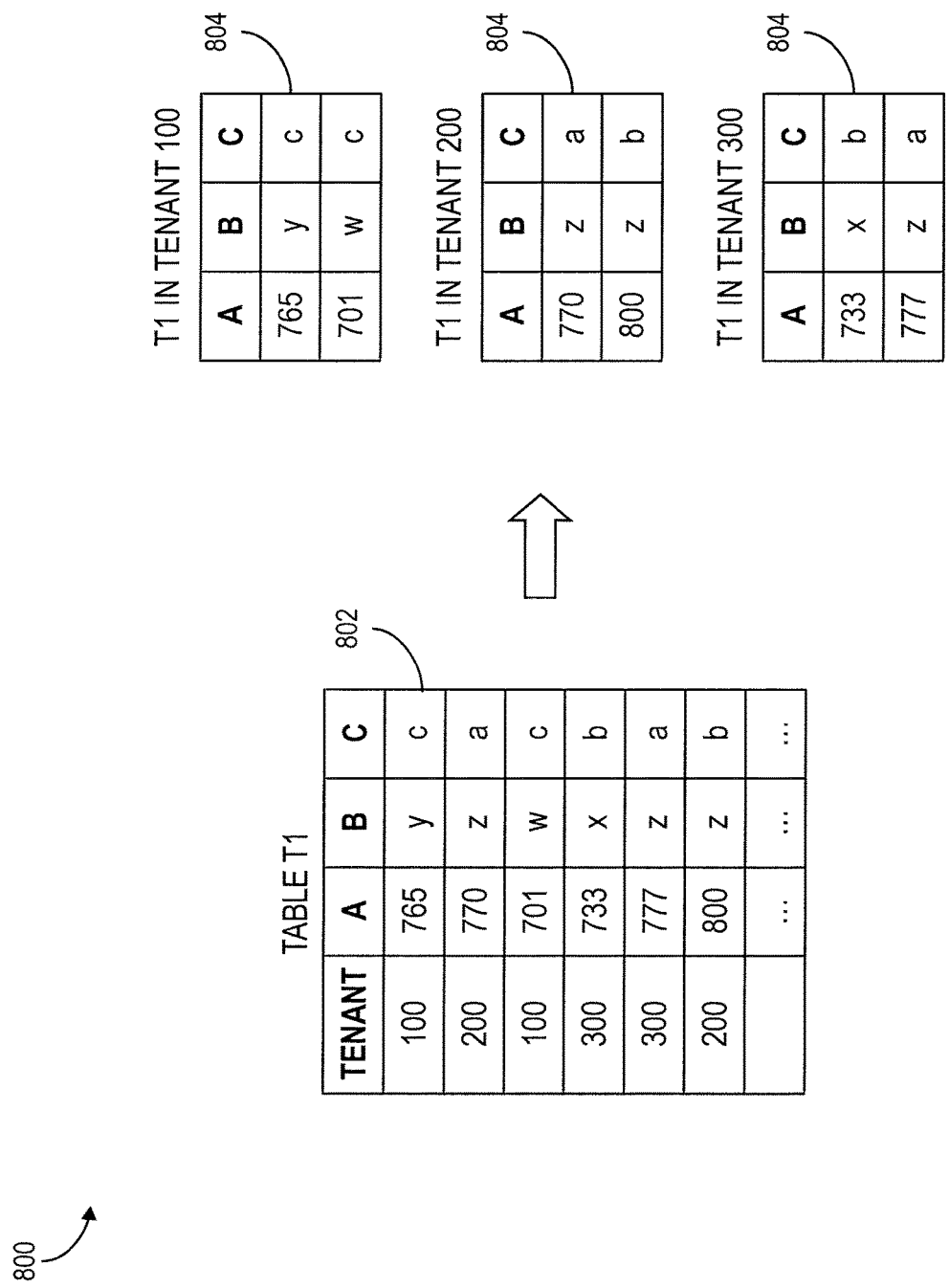
FIG. 8 shows a tables illustrating division of data among tenants in an in-memory multi-tenant architecture.

Implementations of the current subject matter can support multiple tenants 202 at the database level in a multi-tenant system. Tenants 202 of one system share common metadata but for the actual tables that hold application data there are separate instances per tenant. FIG. 8 shows two exemplary table structures 800 for a multi-tenant system including three tenants. Rather than storing data for all tenants in a common table 802 having a tenant identifier column to indicate which entries belong to each tenant, each tenant can store its own data in a dedicated table 804, which does not needed a tenant specifier column.

Figure 9:
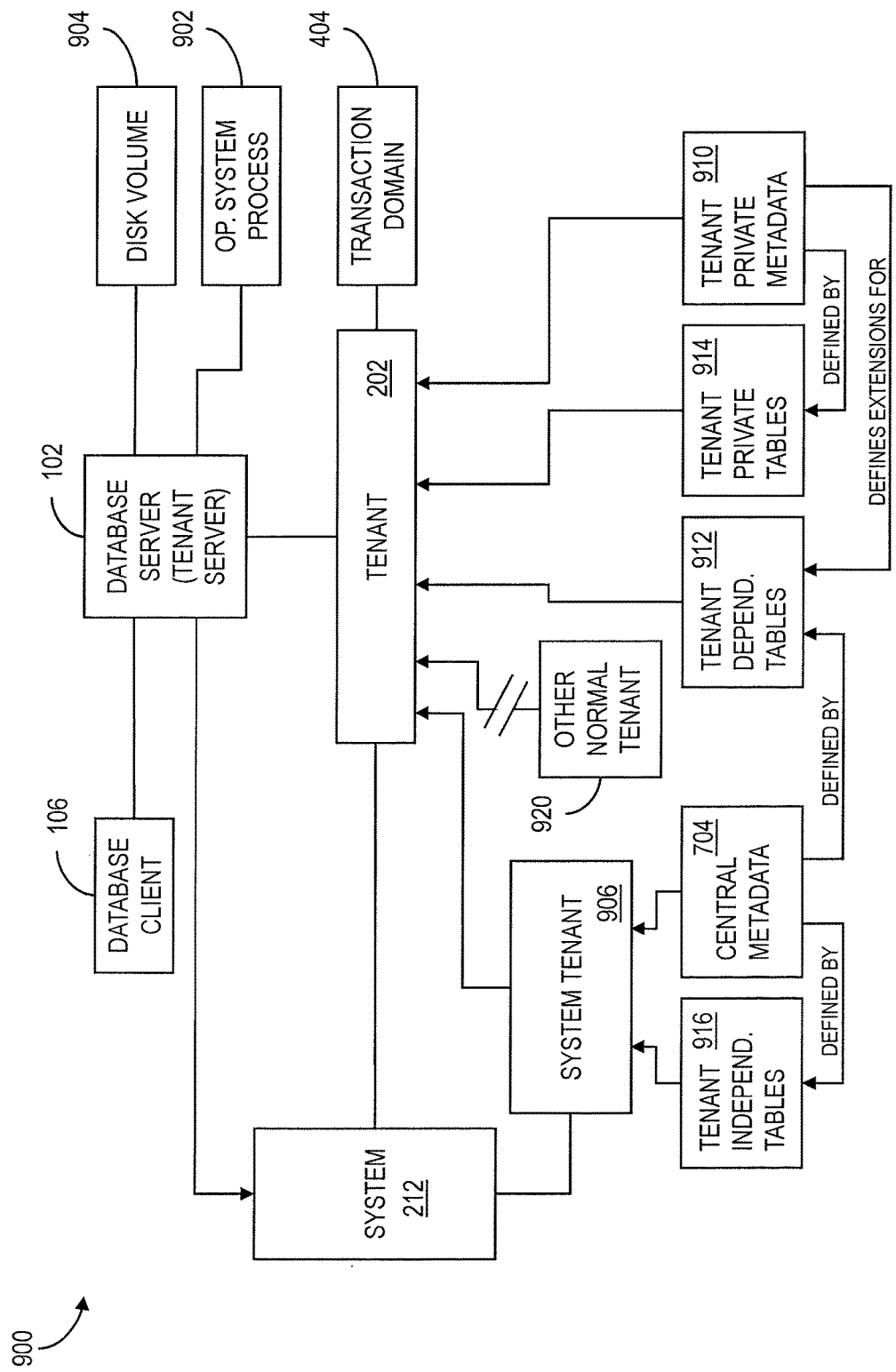
FIG. 9 is a diagram illustrating features of a multi-tenant architecture in an in-memory database system

FIG. 9 illustrates an example of a multi-tenant architecture 900 in an in-memory database system as described herein. A system supporting multiple tenants can feature multiple database servers 102 where each database server 102 uniquely belongs to one tenant 202. In such a configuration, each tenant 202 runs in a different operating system process 902 with its own virtual memory and also has its own disk volume or volumes 904. As used herein, the term "tenant server" is used to refer to the database server 102 that belongs to a specific tenant 202.

According to at least one implementation, a system can include at least one special tenant called the system tenant 906. The system tenant 906 can be the meta data owner of a distributed system and can also contain the central metadata 704 available to all other tenants 202 for read access. Tenants 202 can also have their own private metadata 910 that can define tenant-dependent extensions in tenant-dependent tables 912 that are based on standard tables defined by the central metadata 704. The tenant private metadata 910 can also define tenant private tables 914. The system tenant 906 can contain tenant independent application data stored in tenant independent tables 916 that can be read by all tenants 202. Normal (i.e. non-system) tenants are isolated from each other. In the context of one tenant 202, data from other normal tenants 920 cannot be accessed. If a client 106 needs access to more than one normal tenant (for example a tenant management tool), it needs to open separate database connections to each tenant 202. To improve tenant isolation, each tenant 202 can be assigned to its own transaction domain 404 to ensure that a transaction is restricted to one tenant 202 and that a single transaction cannot span multiple tenants 202, 914.

Having different disk volumes 904 for different tenants 202, 914 can facilitate support for tenant operations such as tenant copy, tenant move, tenant deletion, or the like. When relocating a tenant 202 to a different database server 102 in the same system, the tenant specific disk volume 904 can be detached from the original database server 102 and attached to the new database server 102. For moving or copying tenants 202 between different systems, shared metadata can be handled by ensuring that the tenant data to be moved is consistent with central metadata in the new system.

Figure 10:
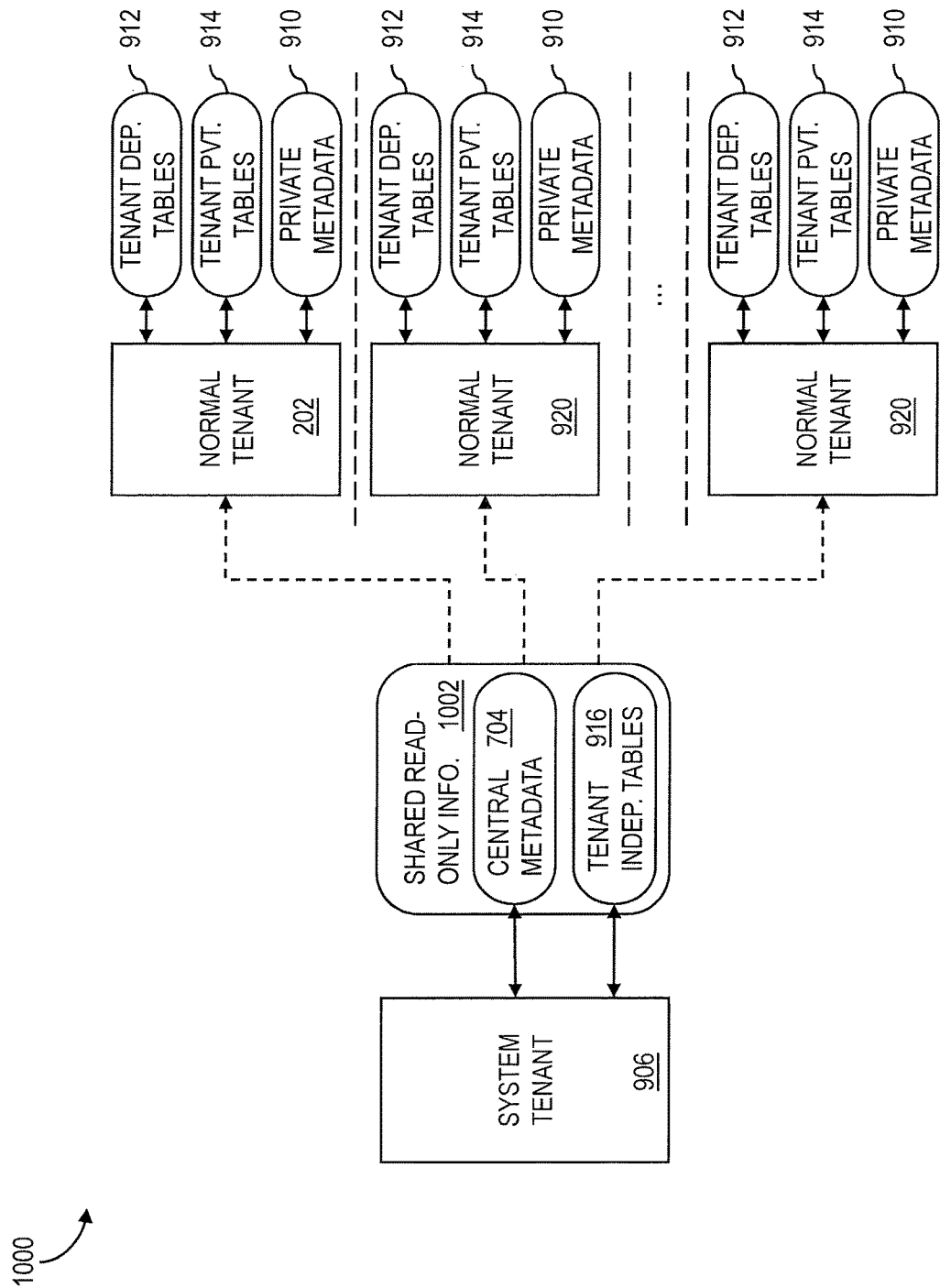
FIG. 10 is a diagram illustrating sharing of data and metadata in a multi-tenant architecture.

The block diagram 1000 shown in FIG. 10 illustrates how data and metadata can be shared in a multi-tenant enabled system. In some implementations, three categories of tables can exist in a multi-tenant in-memory system: tenant independent tables 916, tenant dependent tables 912, and tenant private tables. Tenant independent tables 916 can exist in a single instance per system with data and central metadata 704 as shared read-only information 1002 stored in the system tenant 906. A database server 102 of a normal tenant 202, 920 has read access to the tenant independent tables 916. As noted above, tenant dependent tables 912 can be defined centrally, e.g. by central metadata 704 stored in the system tenant 906. However, each tenant 202, 920 has its own instance of these tenant independent tables 916, which are not visible from other tenants 202, 920. For tenant private tables 914, both metadata and content are local to the tenant 202, 920.

The table 1100 of FIG. 11 further lists features of metadata and content storage and access for the three types of tables. When a table is created in a normal tenant 202, 920, it can be created as a tenant private table 914. Tenant independent tables 916 and tenant dependent tables 912 cannot be created in a normal tenant 202, 920. In the system tenant 906, tables of all three types can be created. The desired type can be specified when the table is created in the system tenant 906.

As stated above, a database client 106 can require multiple database connections if it needs to access more than one tenant 202. However, sometimes applications need to combine tenant dependent tables 912 with tenant independent tables 916, which are stored in the system tenant, in one query—for example in a join operation, a sub query or a union. To process this type of queries, the tenant servers 102 for normal tenants 202, 920 have indirect read access to tenant independent tables 916 (e.g. as noted by the dotted read arrows in FIG. 10). A database client 106 that is connected to the database server 102 of a normal tenant 202, 920 may combine tenant independent tables 916 and tenant dependent tables 912 in the same query. If a tenant database server 102 receives such a query, it can delegate the corresponding operations to the database server 102 of the system tenant 906, combine the results with local results, and return them to the database client 106. In this manner, the database clients need not be aware that the system tenant 906 is involved in the query.

Because the system tenant 906 belongs to a different transaction domain 404, a query that involves access to tenant independent tables 916 can be executed using two different transactions. Therefore, transparent access to tenant independent tables 916 by a normal tenant 202, 920 is limited to read-only operations. If a database server 102 that is assigned to a normal tenant 202, 920 receives a request to modify the content of tenant independent tables 916, it reports an error. A database client 106 that needs to write tenant independent tables 916 must do so by opening a connection to the system tenant server 906.

If metadata is created in a normal tenant 202, 920, it can be stored in the tenant 202, 920 as tenant private metadata 910. Tenant private metadata 910 can define tables, views, functions, and the like that exist only in one tenant 202 and cannot be accessed from other tenants 920. When reading metadata in the context of one tenant 202, 920, the result can be created as the union of central metadata 704 and tenant private metadata 910. This process can be completed by one or more metadata managers 112 and can be hidden from other system components 702.

Figure 12:
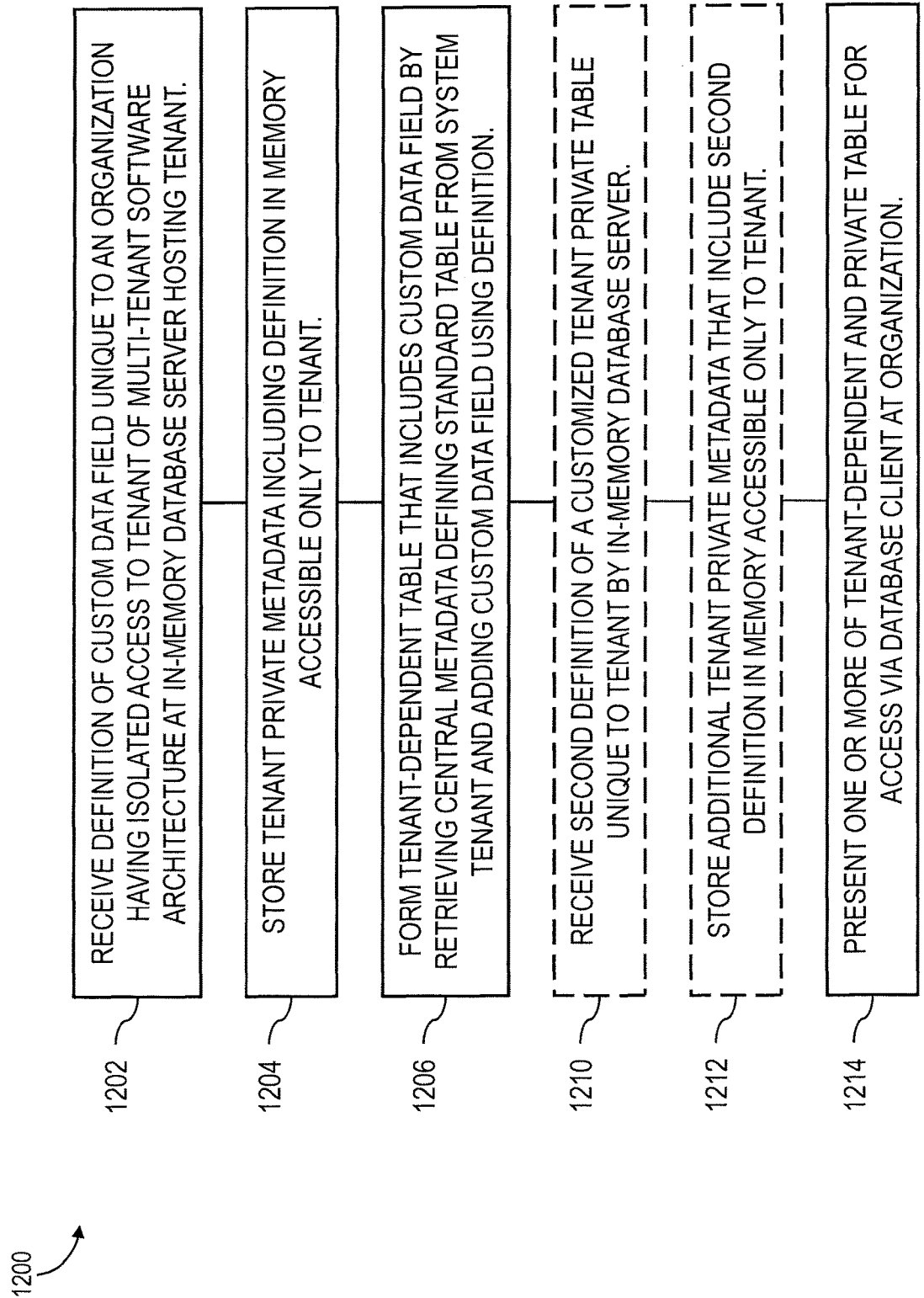
FIG. 12 is a process flow diagram illustrating aspects of a method.

FIG. 12 shows a process flow chart 1200 illustrating features consistent with implementations of the current subject matter. At 1202, an in-memory database server 102 hosting a tenant 202 of a multi-tenant software architecture receives a definition of a custom data field that is unique to an organization having isolated access to the tenant 202. The custom data field extends a standard table defined by central metadata 704 stored at a system tenant 906 of the multi-tenant software architecture. At 1204, tenant private metadata 910 that include the definition are stored in memory accessible only to the tenant 202. A tenant-dependent table 912 that includes the custom data field is formed at 1206. The forming includes retrieving central metadata 704 defining the standard table from the system tenant 906 and adding the custom data field using the definition. In additional optional features, a second definition of a customized tenant private table 914 that is unique to the tenant 202 can be received by the in-memory database server 102 at 1210. At 1212, additional tenant private metadata 910 that include the second definition are stored in memory accessible only to the tenant 202. At 1214, the tenant-dependent and/or private table can be presented for access via a database client 106 at the organization.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory machine-readable medium storing instructions that, when executed by at least one programmable processor, cause the at least one programmable processor to perform operations comprising:
    receiving, at an in-memory database server hosting a tenant of a multi-tenant software architecture, a definition of a custom data field that is unique to an organization having isolated access to the tenant, the custom data field extending a standard table defined by central metadata stored at a system tenant of the multi-tenant software architecture;
    storing, in memory accessible only to the tenant, tenant private metadata comprising the definition;
    forming a tenant-dependent table comprising the custom data field, the forming comprising retrieving, from the system tenant, central metadata defining the standard table and adding the custom data field using the definition; and
    presenting the tenant-dependent table for access via a database client at the organization.

2. A computer program product as in claim 1, wherein the operations further comprise:
    receiving, at the in-memory database server, a second definition of a customized tenant private table that is unique to the tenant;
    storing, in the memory accessible only to the tenant, additional tenant private metadata comprising the second definition; and
    presenting the tenant private table for access via the database client at the organization.

3. A computer program product as in claim 1, wherein the multi-tenant software architecture comprises a plurality of tenants hosted at a backend system, each tenant of the plurality of tenants comprising its own dedicated in-memory database server having unique access to tenant-specific data, at least one of the plurality of database servers being provided via each of a plurality of hosts on the backend system.

4. A computer program product as in claim 3, wherein the plurality of database servers share the central metadata of the system tenant.

5. A computer program product as in claim 3, wherein the system tenant comprises a central metadata master database server responsible for creating and maintaining the central metadata, and wherein each host of the plurality of hosts comprises a local metadata master database server that receives a copy of the central metadata from the central metadata master database server.

6. A computer program product as in claim 5, wherein the operations further comprise:
    receiving, at the central metadata master database server, an updated definition of a tenant dependent table that is available to all of the plurality of tenants;
    storing, in a system tenant memory accessible only to the system tenant, new central metadata comprising the updated definition; and
    propagating the new central metadata to each local metadata master database server for use by the plurality of tenants.

7. A system comprising:
    at least one programmable processor; and
    a non-transitory machine-readable medium storing instructions that, when executed by the at least one programmable processor, cause the at least one programmable processor to perform operations comprising:
    receiving, at an in-memory database server hosting a tenant of a multi-tenant software architecture, a definition of a custom data field that is unique to an organization having isolated access to the tenant, the custom data field extending a standard table defined by central metadata stored at a system tenant of the multi-tenant software architecture;
    storing, in memory accessible only to the tenant, tenant private metadata comprising the definition;
    forming a tenant-dependent table comprising the custom data field, the forming comprising retrieving, from the system tenant, central metadata defining the standard table and adding the custom data field using the definition; and
    presenting the tenant-dependent table for access via a database client at the organization.

8. A system as in claim 7, wherein the operations further comprise:
    receiving, at the in-memory database server, a second definition of a customized tenant private table that is unique to the tenant;
    storing, in the memory accessible only to the tenant, additional tenant private metadata comprising the second definition; and
    presenting the tenant private table for access via the database client at the organization.

9. A system as in claim 7, wherein the multi-tenant software architecture comprises a plurality of tenants hosted at a backend system, each tenant of the plurality of tenants comprising its own dedicated in-memory database server having unique access to tenant-specific data, at least one of the plurality of database servers being provided via each of a plurality of hosts on the backend system.

10. A system as in claim 9, wherein the plurality of database servers share the central metadata of the system tenant.

11. A system as in claim 9, wherein the system tenant comprises a central metadata master database server responsible for creating and maintaining the central metadata, and wherein each host of the plurality of hosts comprises a local metadata master database server that receives a copy of the central metadata from the central metadata master database server.

12. A system as in claim 11, wherein the operations further comprise:
    receiving, at the central metadata master database server, an updated definition of a tenant dependent table that is available to all of the plurality of tenants;
    storing, in a system tenant memory accessible only to the system tenant, new central metadata comprising the updated definition; and
    propagating the new central metadata to each local metadata master database server for use by the plurality of tenants.

13. A computer-implemented method comprising:
    receiving, at an in-memory database server hosting a tenant of a multi-tenant software architecture, a definition of a custom data field that is unique to an organization having isolated access to the tenant, the custom data field extending a standard table defined by central metadata stored at a system tenant of the multi-tenant software architecture;

storing, in memory accessible only to the tenant, tenant private metadata comprising the definition;

forming a tenant-dependent table comprising the custom data field, the forming comprising retrieving, from the system tenant, central metadata defining the standard table and adding the custom data field using the definition; and presenting the tenant-dependent table for access via a database client at the organization.

14. A computer-implemented method as in claim 13, further comprising:

receiving, at the in-memory database server, a second definition of a customized tenant private table that is unique to the tenant;

storing, in the memory accessible only to the tenant, additional tenant private metadata comprising the second definition; and presenting the tenant private table for access via the database client at the organization.

15. A computer-implemented method as in claim 13, wherein the multi-tenant software architecture comprises a plurality of tenants hosted at a backend system, each tenant of the plurality of tenants comprising its own dedicated in-memory database server having unique access to tenant-specific data, at least one of the plurality of database servers being provided via each of a plurality of hosts on the backend system.

16. A computer-implemented method as in claim 15, wherein the plurality of database servers share the central metadata of the system tenant.

17. A computer-implemented method as in claim 15, wherein the system tenant comprises a central metadata master database server responsible for creating and maintaining the central metadata, and wherein each host of the plurality of hosts comprises a local metadata master database server that receives a copy of the central metadata from the central metadata master database server.

18. A computer-implemented method as in claim 17, wherein the operations further comprise:

receiving, at the central metadata master database server, an updated definition of a tenant dependent table that is available to all of the plurality of tenants;

storing, in a system tenant memory accessible only to the system tenant, new central metadata comprising the updated definition; and propagating the new central metadata to each local metadata master database server for use by the plurality of tenants.

19. A computer-implemented method as in claim 13, wherein at least one of the receiving, the storing, the forming, and the presenting is performed by at least one programmable processor.

* * * * *